March 26, 1957 J. R. DAWSON 2,786,371
FIXTURE FOR JET ENGINE BURNERS FOR LOCATING THE POSITION
OF THE INNER LINER RELATIVE TO THE OTHER TUBE
Filed July 26, 1954 4 Sheets-Sheet 4

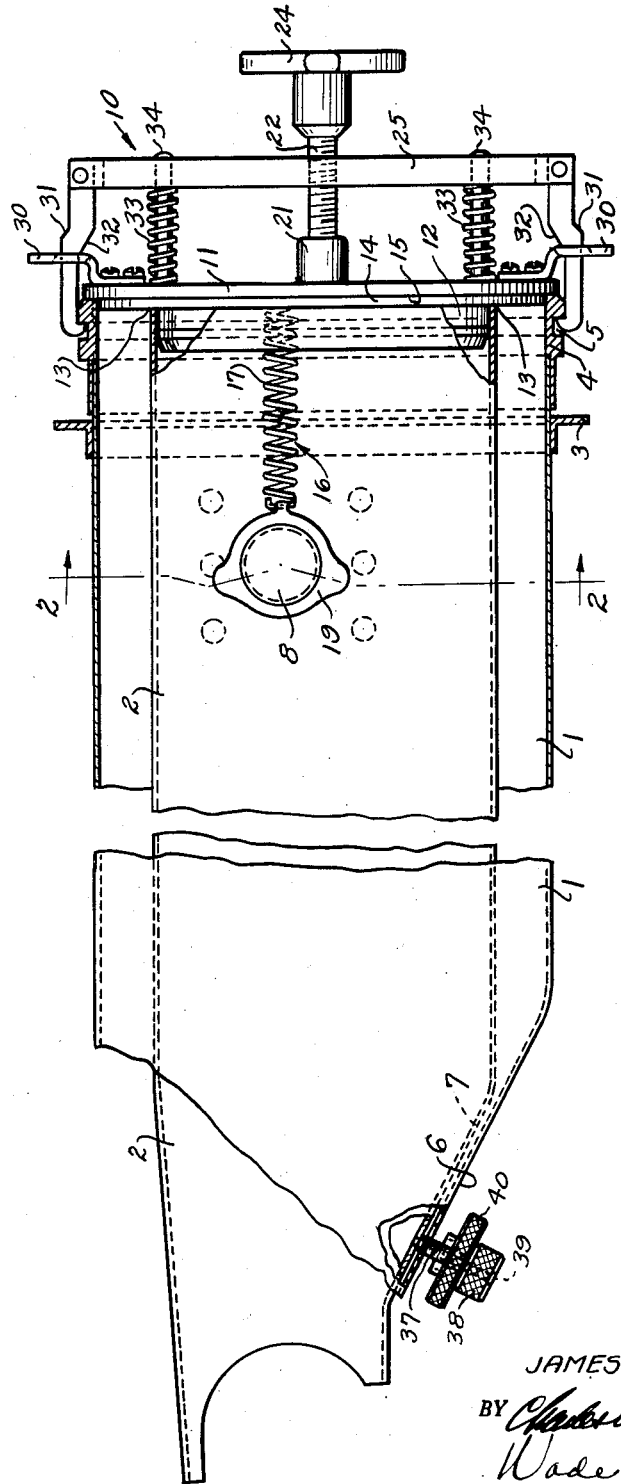

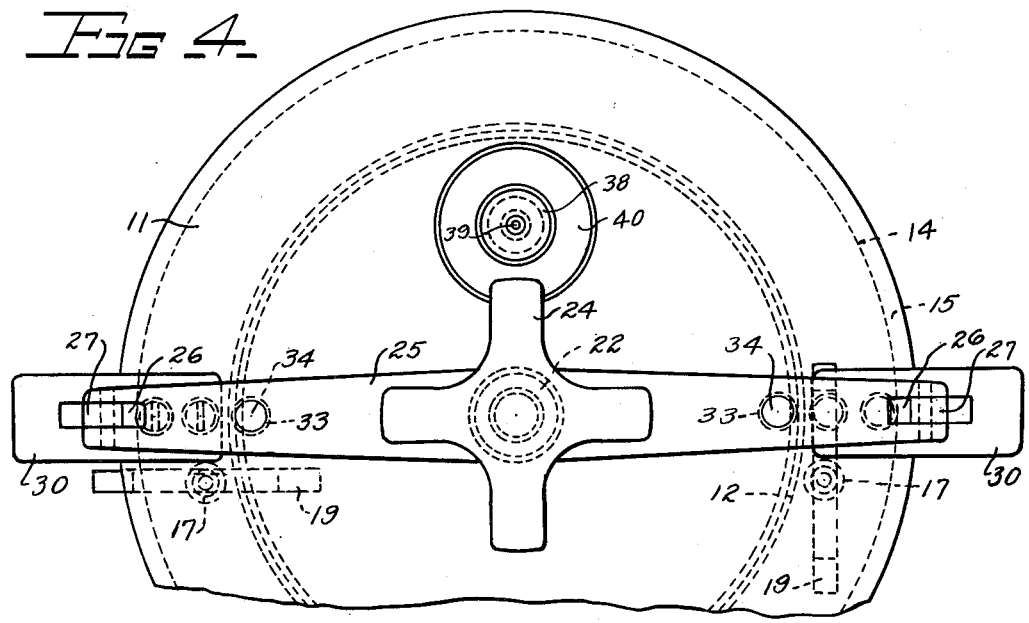
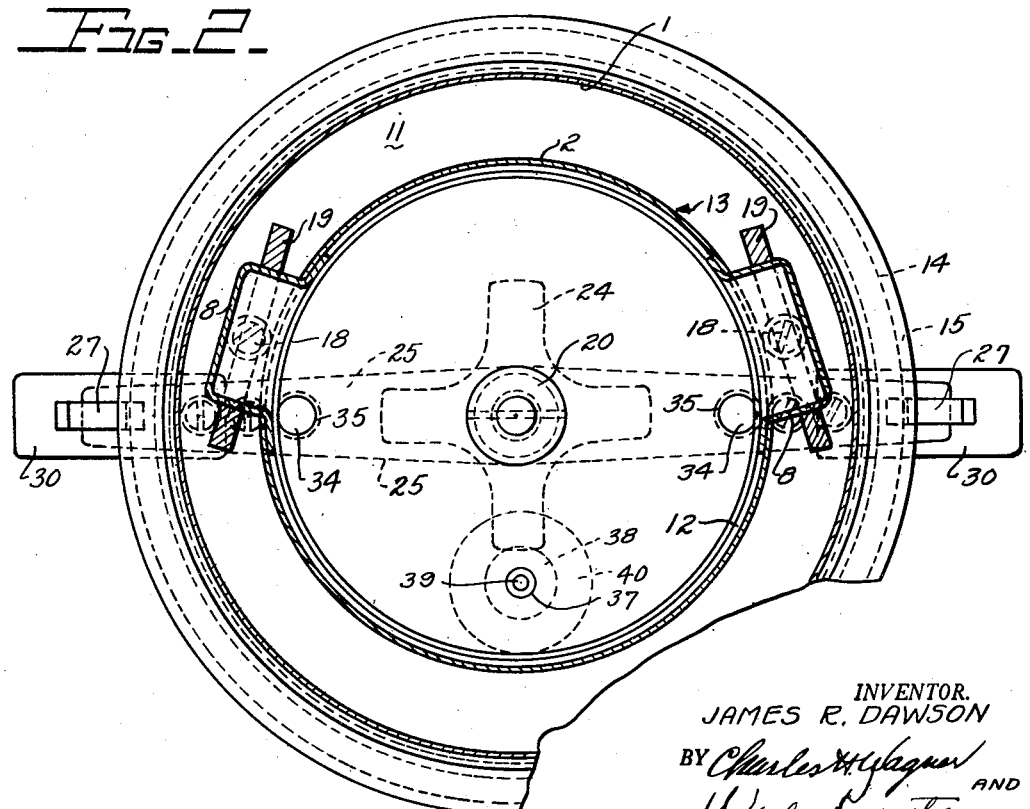

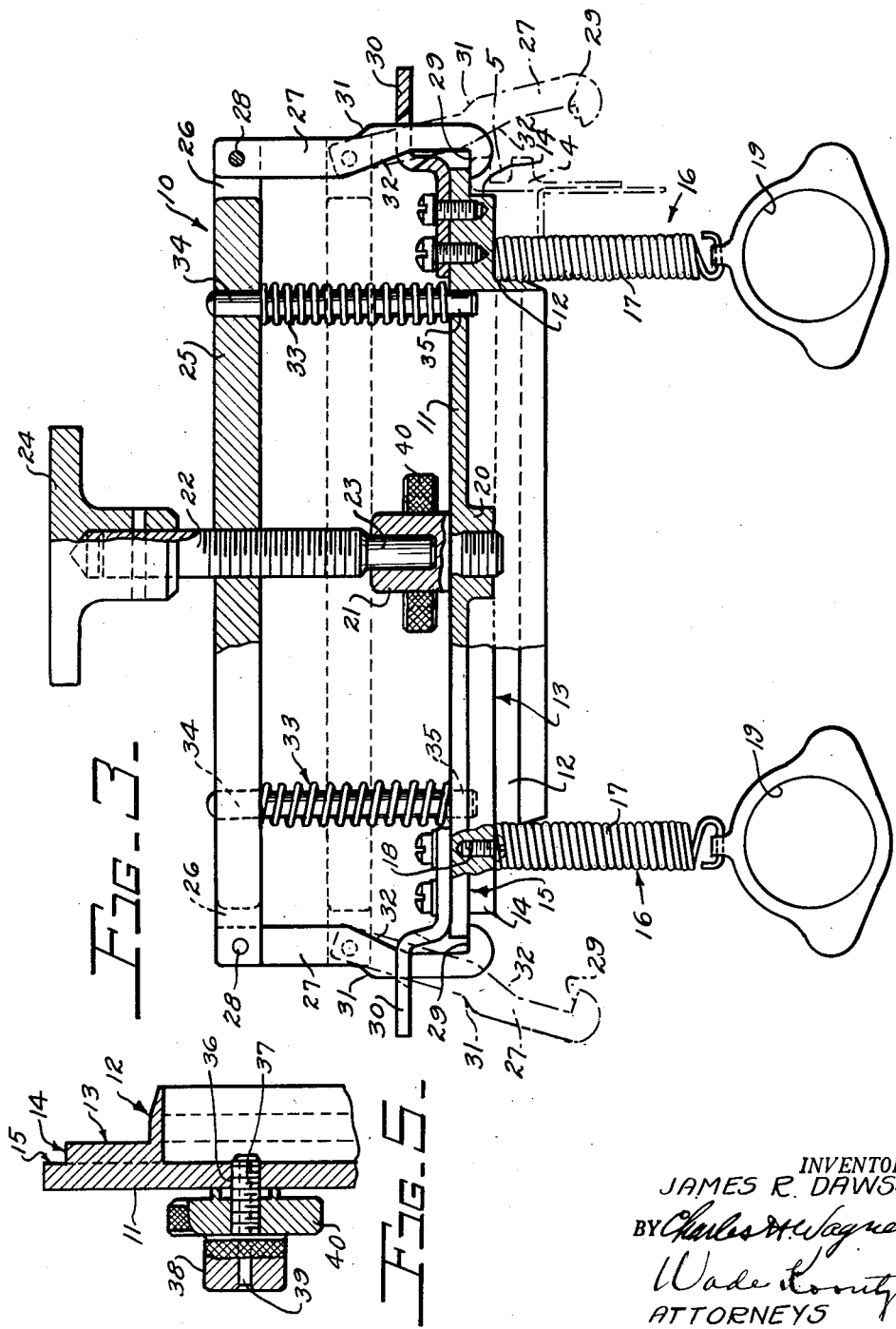

INVENTOR.
JAMES R. DAWSON
BY *Charles W. Wagner*
*Wade Loouty* AND
ATTORNEYS

United States Patent Office 2,786,371
Patented Mar. 26, 1957

2,786,371

FIXTURE FOR JET ENGINE BURNERS FOR LOCATING THE POSITION OF THE INNER LINER RELATIVE TO THE OTHER TUBE

James R. Dawson, Dayton, Ohio

Application July 26, 1954, Serial No. 445,945

8 Claims. (Cl. 77—62)

(Granted under Title 35, U. S. Code (1952), sec. 266)

The invention described herein may be manufactured and used by or for the Government for governmental purposes without the payment to me of any royalty thereon.

This invention relates to locating fixtures or jigs, and more particularly to a fixture employed in the assembly of burners for turbo-jet gas turbine engines.

The turbo-jet engine burners to which the invention is particularly applicable includes two concentrically spaced cylindrical sleeve members or tubes comprising an outer combustion chamber or burner tube and an inner liner therefor, one end of each liner and tube, hereafter referred to as the "upper ends" for convenience, in the final assembly, bear a definite longitudinally and rotatively fixed relation to each other when assembled in a turbo-jet motor, and in order to be able, always, after disassembly, to return the tubes or sleeves to a position where they bear the same aforesaid fixed relation to each other, applicant's novel fixture or jig is provided to hold the tubes concentric with their upper ends in the desired predetermined relation to each other, after which they are secured together in that relation by the use of a removable dowel pin centering device forming a part of the fixture, or secured together by a screw fastener device.

An object of my invention, therefore, is the provision of an improved semiautomatic assembly jig, or fixture, or gauge for holding a turbo-jet burner tube and liner therefor in concentric relation and includes adjusting means for adjusting the axial or longitudinal position of the liner in the burner tube to dispose the upper ends thereof in a predetermined relation to each other, including the provision of alignment means for locating and/or positioning the other ends of the liner within the tube in predetermined position, rotatively about their coincident axes, relative to each other.

A further object is the provision of an improved jig fixture device for burner tubes and liners of jet propulsion motors for accurately positioning a liner of nonsymmetrical form within a burner tube in the exact position that it should occupy in the turbo-jet motor, including novel dowel positioning means adapted to be secured in an aperture in the burner tube while the liner and burner tubes are held in said exact predetermined axial, concentric and rotatively adjusted positions, including drill guide means through said dowel means for guiding a drill, whereby a replacement liner may be drilled to receive a fastener through said aperture to secure the burner and liner assembly together for accurate replacement in the turbo-jet motor.

A further object of my invention is the provision of spring means on the liner tube supporting means for retaining the said supporting means on the upper end of the liner tube and latch means carried by the supporting means for engaging and supporting the burner tube concentrically around the liner and adjusting means between the supporting means and the latch means for adjusting the latch means longitudinally of the liner to adjust the longitudinal position of the burner tube axially relative to the position of the liner therein.

Other objects and advantages will become apparent from the following description and accompanying drawings in which like reference characters refer to like parts in the several figures.

Drawings

Figure 1 is an elevation view partly broken away, and foreshortened intermediate its ends, of an outer or burner tube and a liner tube therefor showing my improved positioning fixture or jig applied thereto.

Figure 2 is a transverse section taken about on line 2—2 of Fig. 1, looking in the direction of the arrow.

Figure 3 is side elevation of my fixture jig, parts being broken away and shown in section, the dotted lines show up the position of the latch members nonoperative positions.

Figure 4 is an end plan view of my improved fixture or jig shown in Fig. 3, partly broken away, and Figure 5 is a fragmentary sectional detail view of the alignment bushing and drill guide members, screwed in the main plate of the jig to prevent its misplacement or loss when not in use.

Figure 7:
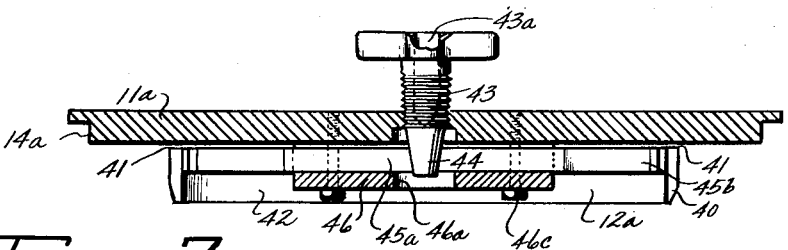
Figures 6 and 7 are detail plan and sectional views respectively of the main support plate of the invention illustrating a modified arrangement of the means for securely retaining the liner tube in position on the pilot flange provided therefor.

Referring first to Figure 1 of the drawings, showing the application of my invention to an outer tube and liner therefor, of a turbo-jet gas turbine combustion chamber, the reference numeral 1 denotes the outer tube, and 2 its inner tube or liner. One end of the outer tube 1 is formed with an annular seating flange 3, a collar 4 being fixed to the exterior of the circular end thereof and formed with an annular groove or channel 5.

The opposite, or discharge end of the outer tube 1 is tapered at 6, also the liner can 2 is likewise tapered at 7; these two tapered or inclined surfaces 6 and 7 being disposed in juxtaposed relation as shown. The liner 2 has cylindrical projections or ears 8, projecting radially outward from its periphery as shown in Figures 2 and 7. The foregoing represents an outer tube and liner therefor of conventional construction.

The liner 2 has a definite predetermined axial and rotative adjustment relation or position within the outer tube 1 as shown. The outer tube and liner are preferably secured together by a screw fastener extending through the two members at the point 8. However, in replacing a new liner in its proper position within the outer tube the position of the opening for the fastener just mentioned must be accurately located, and, preferably a "pilot" hole drilled through the liner in alignment with the fastener hole in the outer tube. The outer or cylindrical end of the liner 7 must also be accurately determined with respect to the outer or cylindrical extremity of the outer tube 1.

My improved fixture or jig device, indicated generally at 10, is primarily for this purpose and comprises an annular support or circular plate 11 having a liner sleeve pilot means thereon in the form of an annular flange 12 formed with a stop shoulder 13, the periphery of the stop shoulder 13 being disposed concentric to the annular flange 12 provides a second annular pilot flange 14 for receiving the flanged end of the outer tube 1 thereon, the plate or support 11 being circular, with its periphery stepped back concentrically to form a second annular stop flange or shoulder 15. The transverse plane containing the stop shoulder 13 is perpendicular to the central axis of the plate 11, and is disposed in a predetermined parallel relation to the plane containing the annular stop shoulder 15, so that when a liner tube 2 is placed over the flange 12 with its end seated against the shoulder 13, and an outer tube 1 is seated on the outer annular flange 14 against the annular stop shoulder of face 15, the liner and outer tube will be in their proper predetermined concentric and longitudinal relation to each other.

The bottom or inner face of the support or plate 11 has spring means 16 secured thereto for connection to the opposite sides of the liner to tension the liner into seating engagement with the annular stop flange 15 on the pilot flange 12. The spring means 16 comprises a pair of helical coil springs 17 each connected at their inner ends to the plate 11 by screws 18, located in transverse planes passing through the axes of the extensions 8 parallel to the axes of the liner 1 and the outer tube 2, located rather close to the exterior wall of the liner 2, the springs 17 being connected at their outer ends to rings or eyes 19 which are designed to slip over the cylindrical extensions 8 with the springs 17 under tension so as to thus pull or seat the end of the liner 2 on the pilot flange 12 against the stop shoulder or annular abutment surface 13.

The center of the plate 11 has a threaded boss 20 formed thereon in which a socketed hub member 21 is secured as shown in Fig. 3. An adjustment jackscrew member 22 is provided, having its inner end 23 journalled in the socket of the hub member 21, an adjustment handle or knob 24 being fixed on the other or outer end of the screw 22 for rotative adjustment thereof.

An adjustable drawbar or crossbar 25, best seen in Figs. 2 to 5 is threadably mounted on the jackscrew 22, the opposite ends of the crossbar 25 being bifurcated at 26 to receive a pair of outer tube drawing latches or hooks 27, the latter being pivoted to the drawbar 25 by pivots 28.

The latches 27 are formed with hook extremities 29 adapted to engage in the annular channel 5 in the outer tube 1 as shown in Fig. 1. Hook or latch retainer camming plates 30 are secured on the outer surface of the plate 11 at opposite sides thereof. These plates 30 being slotted to receive the latch members 27 therethrough, the opposite ends of these slots coacting with cam surfaces 31 and 32 on the edges of the latch members, for swinging the latch members 27 outwardly to disengaging positions as the drawbar 25 is moved toward the plate 11, and inwardly into the channel 5 of an outer tube 1 when the crossbar 25 is shifted outwardly, to thus engage the flange 4 and maintain the engagement during the axial adjustment of the outer tube 1 relative to the inner tube or liner 2. Spring means are also provided, indicated at 33, and located between the plate 11, and the drawbar 25, the springs 33 being mounted on guide rods 34 which are slidable in guide holes 35 through the bar 25 with their other or inner ends preferably secured in the plate 11 as shown.

The plate 11, as shown in Fig. 5, is threaded at one side of the center at 36 to receive the threaded stem 37 of a drill bushing 38 having a drill guide receiving bore 39 therethrough, and a locknut 40 is threaded on the stem 37 for locking the stem 37 in any longitudinal adjustment position in the outer tube 1.

The drill bushing is located on the plate 11 as shown, for convenience when not in use. However, when in use with the inner and outer tubes 2 and 1 are held in their desired predetermined positions on the plate 11 as shown in Figure 1, the bushing 37 is removed from the plate 11 and screwed into a hole provided in the outer tube 1, as illustrated in Figure 1, with its outer end (end opposite the thumbnut 38) disposed in contact with the outer surface of inner tube portion 7. A suitable drill is then inserted through the central drill guide opening 39 and rotated to drill a pilot or positioning hole in the inner tube or liner 2.

After the tube and liner have been assembled the handle 24 may be rotated in the proper direction to shift the bar 25 toward the plate 11, causing the latches 27 to disengage the outer tube flange 5, also the rings 19 are shifted outwardly to disengage the cylindrical bosses 8 on the liner, thus freeing the tubes from the fixture device.

The drill bushing and drill guide means may be removed and screwed into the plate 11, in the opening therein provided, and the jam nut tightened to secure the drill bushing thereon until required for further use.

Figure 6:
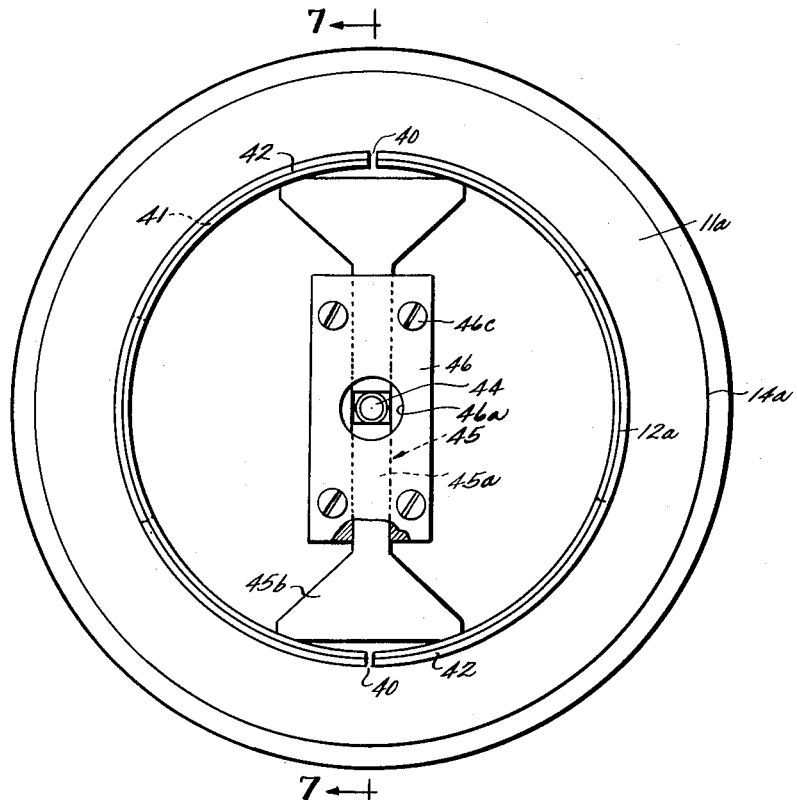

Referring to the modification shown in Figures 6 and 7, the supporting plate is illustrated at 11a and is provided with circular pilot flanges 12a and 14a for the liner and tube members 2 and 1. The cross bar and associated elements employed are similar to the elements 25, 27, 22, 24 and 33 shown in the preferred form in Figures 1 to 5 and therefore omitted from the pilot modification, the outer tube pilot flange 14a and camming plates for the latches being also similar. The circular pilot flange 12a is modified, however, in that it is slit longitudinally at diametrically opposite sides, as indicated at 40, and also slit circumferentially from the slits 40 in opposite directions next to the base plate 11a, as indicated at 41 to provide a pair of clamping or friction holding fingers 42 for the liner at opposite sides of the base plate 11a.

When a liner is slipped on the pilot flange 12a and seated against the shoulder 13a the curved slit portions or fingers 42 of the flange 12a are adapted for outward frictional contacting movement against the inner surface of the liner to secure the liner 2 in position on the plate 11a.

The means for expanding the fingers 42 into tight frictional holding contact with the liner are as follows: The boss 21 of the preferred form is replaced by a clamping screw 43, threaded into an opening provided at the center of the plate, the inner end of the screw 43 being tapered to provide a conical camming head 44 as shown in Fig. 7. A pair of clamping or spreading actuators 45 are provided, disposed in sliding relation to the inner surface of the plate 11a, within the confines of the liner pilot flange 12a. These spreader actuators 45, best seen in Figure 6, each comprise a rectangular shank portion 45a disposed for outward camming action by the conical camming head 44. The opposite end of each actuator is formed with a relatively wide camming head 45b with the opposite sides thereof disposed in engagement with the inner surfaces of the clamping fingers 42 at opposite side of the slits 40.

A retainer plate or clip member 46 straddles the inner ends of the shank portions 45a of the actuators 45, a rectangular guide opening therein being provided for receiving and guiding the shank portions when cammed outwardly by the camming head 45b. A hole 46a is provided in the plate 46 for the camming head as shown, the plate 46 being secured to the back of the plate 11a by suitable fastening, such as screws or bolts 46c.

The operation of the modified tool or fixture is substantially the same as that described in connection with the preferred forms with the exception that instead of the liner being centered by the liner pilot flange and held against the stop shoulder by the two spring members 17, which are connected to the ears 19 at opposite sides of the liner, the liner is now inserted over the pilot flange with the camming head 45b retracted. The handle for the clamping screw 43 being then rotated to advance the comming head 44 to force the spreader actuators 45 outward radially, forcing the clamping fingers 42 tightly into frictional holding contact with the inner surface of the end of the liner.

This arrangement makes it easier to insert a liner in its proper position on the fixture and provides a positive, tight, and secure mounting therefor when the pilot fingers are expanded, also the release and removal of the liner is more easily accomplished.

The outer end of the clamping screw 43 carrying the handle portion is socketed at 43a similar to the boss 21 to receive the end of the draw bar actuating member (similar to screw 22) for actuating a draw bar (not shown), similar to the part 25 in Fig. 1.

The clamping fingers 42 are resilient and therefore when the camming head 45b is retracted the finger portions 42 of the pilot flange 12a spring sufficiently to retract the actuators 45 and remove the holding pressure from the liner.

The above invention has been shown and described in connection with a preferred embodiment and a slight modification for exemplary purposes, it being contemplated that obvious changes, other modifications, and improvements may be made therein without departing from the scope and spirit of the invention as defined in the accompanying claims.

I claim:

1. A jig for supporting an outer tube and a spaced apart liner tube concentrically therein with their upper ends in predetermined axial relation to each other comprising, an annular main support having liner tube centering pilot means thereon for entering and centering a liner tube thereon, and formed with stop shoulder means adapted to abut the end of the liner tube to limit axial movement, spring tensioning means spaced outwardly from and adjacent to the pilot means, adapted for connection to the opposite sides of a liner tube when mounted on the pilot means for drawing the liner tube toward the support into abutting engagement with the stop shoulder means to fix the position of the liner on the support, concentric burner tube centering means carried on said support, spaced outwardly from the aforesaid liner tube centering means, and burner tube abutment shoulder means formed on said support outwardly of said burner tube centering means for longitudinal movement limiting engagement with the end of a burner tube having a flanged end, adjustable drawing means carried by said support for movement toward and away from said stop shoulder means, burner tube latching engaging means carried by said drawing means outwardly of the burner tube stop shoulder means located at opposite sides of the support for latching engagement with the flanged end of a burner tube mounted on said burner tube centering means, said burner tube drawing means including actuating means operable between said support and said drawing means for moving said drawing means away from said support to move the flanged end of a burner tube on said centering means, when engaged by said actuating means toward said burner tube stop shoulder means.

2. An assembly jig for supporting an outer burner tube and an inner liner tube for a turbo-jet motor in concentrically spaced predetermined relation comprising, a support having liner tube centering means thereon for centering a liner tube thereon and formed with movement limiting means thereon adapted to abut the end of a liner tube carried on said centering means, means on the support adapted for connection to a liner tube mounted on the centering means for moving the liner tube into abutting relation with said movement limiting means to fix the longitudinal position of a liner tube on the support, burner tube centering means on said support concentrically surrounding the liner tube centering means, burner tube movement limiting means carried by said support, outwardly of the burner tube centering means, for movement limiting engagement with the end of a burner tube mounted on the burner tube centering means to predetermine the position of the end thereof relative to the end of a liner tube when mounted on the liner tube centering means in abutting relation with said liner tube longitudinal movement limiting means, adjustable drawing means carried by said support for movement toward and away from said support in a direction longitudinally of liner and burner tubes when positioned on the centering means, actuating means between the support and drawing means for moving the drawing means in said direction longitudinally, burner tube engaging means carried by the drawing means located outwardly of said burner tube centering means for interlocking engagement with the exterior of a burner tube mounted on said burner tube centering means, for actuation thereof by the said drawing means, to move the end of a burner tube when mounted on the burner tube centering means, toward said burner tube movement limiting means.

3. In a fixture for determining the position of a liner concentrically within a burner tube for a turbo-jet gas turbine power plant, an annular supporting plate, an inner cylindrical extension projecting from one face thereof having an annular stop shoulder formed thereon, for receiving a cylindrical liner and positioning the same thereon with its longitudinal axis normal to the plane of the plate, coil spring tension means connected at one end to the plate at opposite sides thereof, radially outward of said cylindrical extension, connecting means at their opposite ends for connection to a liner at opposite sides thereof, when mounted on said extension, an annular outer concentric cylindrical extension projecting from said plate in the same direction as the inner cylindrical extension and having an annular stop shoulder formed thereon, for receiving a burner tube thereon in predetermined concentric and longitudinal relation to a liner tube when mounted on the inner cylindrical extension and retained against the first mentioned stop shoulder means by said spring means, a crosshead carried by said plate in spaced relation from the side of the plate opposite to said extensions, guide means between the plate and the crosshead, providing for guiding movement of the crosshead toward and away from said plate, adjusting means between the plate and crosshead for adjusting the crosshead toward or away from the plate, burner tube interengaging means connected to the opposite ends of the crosshead, at the opposite sides of the plate, formed with burner tube engaging ends disposed at opposite sides of the outer cylindrical extension, for interlocking engagement with the flanged end of a burner tube when mounted on the outer cylindrical extension for moving the burner tube toward abutting engagement with the outer cylindrical extension stop means, to position a burner tube on the plate concentrically and longitudinally in a predetermined position relative to a liner therefor mounted on the inner extension with its end in engagement with the inner extension stop means.

4. In a burner and liner tube assembly positioning fixture, an annular supporting plate, having concentric cylindrical burner and liner tube supporting extensions projecting from one face thereof having concentric axes perpendicular to the plate, said extensions each having stop shoulders formed thereon disposed in predetermined relatively different planes perpendicular to said axes of the cylindrical extensions, liner tube connecting means carried by said plate intermediate said concentric tube supporting extension, including means thereon for connection to a liner tube, when mounted on the liner tube extension to tension the end of a liner tube so mounted against the liner tube stop shoulder, a crosshead member disposed diametrically across the opposite face of the supporting plate, in spaced parallel relation thereto, guide means between the plate and crosshead member for guiding the crosshead member toward and away from the plate, manually operable jackscrew means disposed axially of the plate and operable between the plate and crosshead member for moving the crosshead member away from the plate, said crosshead member having its opposite ends projecting radially outward beyond the opposite sides of the burner tube supporting extension, a burner tube drawing latch member pivoted to each end of the crosshead and extending past the opposite sides of the supporting plate, said latch members terminating in inturned hooked extremities projecting toward the axis of the plate adjacent the burner tube extension, below the burner tube stop shoulder, for latching engagement with the annular flanged end formed on a burner tube to draw the burner tube when mounted on the burner tube extension, into seating engagement with said burner tube stop shoulder.

5. Apparatus as claimed in claim 4 including cooperated camming means between the plate and latch members for moving said latch members radially outward into inoperative positions upon predetermined movement of the crosshead member inward toward said plate, and swinging the latch members radially inward toward said burner tube extension upon predetermined movement of said crosshead member outward away from said plate.

6. Apparatus as claimed in claim 4 including spring means between said plate and said crosshead member yieldably tensioning said crosshead member for movement axially of said plate outwardly away from the plate.

7. Apparatus as claimed in claim 4 including guide plates fixed on the opposite sides of the plate having cam guide slots therethrough for receiving and guiding the latch members therethrough, and cooperating cam means formed on the opposite edges of the latch members, disposed for camming engagement with the ends of the camming slots to move the latch members outwardly away from each other upon predetermined inward movement of the crosshead member toward said plate and to move the latch members inwardly toward each other upon predetermined outward movement of the crosshead member away from the plate.

8. An assembly jig for supporting an outer and an inner tube for a turbojet motor in concentrically spaced predetermined relation comprising a support having liner tube centering means thereon centering and supporting the liner tube and stop means abutting the end of the liner tube on the centering means, means carried by said support and adapted to be connected to the liner tube for holding the same in abutting relation with said liner tube stop means, fixing the longitudinal position of said liner tube on said support, burner tube centering means on said support concentrically surrounding the liner tube centering means and liner tube stop means for receiving one end of said burner tube thereon, burner tube stop means on said support for engaging the end of the burner tube that is on said burner tube centering means to position the burner tube in concentric predetermined longitudinal relation to the liner tube within the same, adjustable burner tube drawing means carried by said support for releasable connected engagement with said burner tube, for holding the burner tube in abutting relation with said burner tube stop means.

References Cited in the file of this patent
UNITED STATES PATENTS

| | | |
|---|---|---|
| 1,032,933 | O'Brien | July 16, 1912 |